June 19, 1951  
L. C. FETTERLY  
CONVERSION OF HYDROSULFIDES TO NEUTRAL SULFUR COMPOUNDS  
2,557,643
Filed Oct. 28, 1947                                   2 Sheets-Sheet 2
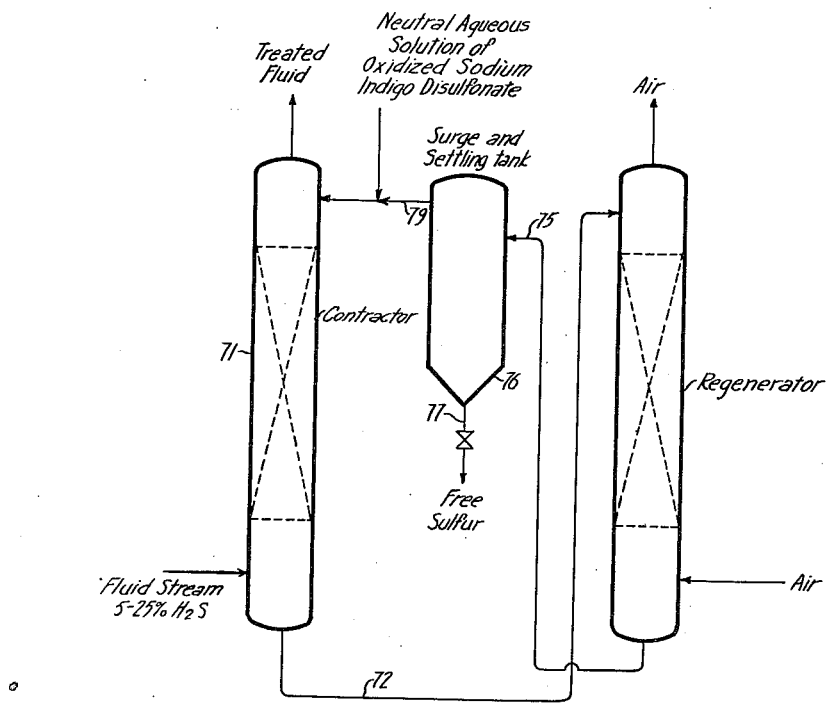
Fig. II
Inventor: Lloyd C. Fetterly  
By his Agent: John H. Colvin Patented June 19, 1951

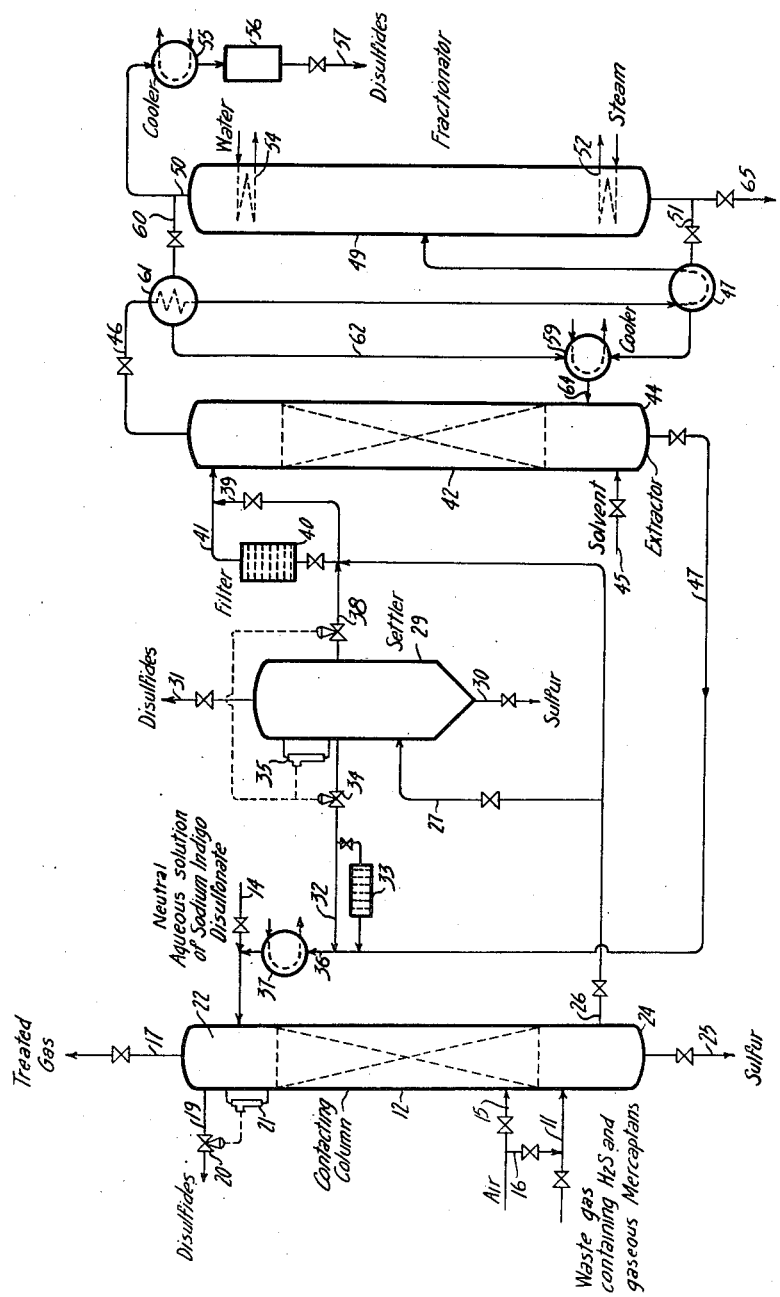
Fig. I

2,557,643

UNITED STATES PATENT OFFICE 2,557,643

CONVERSION OF HYDROSULFIDES TO NEUTRAL SULFUR COMPOUNDS

Lloyd C. Fetterly, Seattle, Wash., assignor to Shell Development Company, San Francisco, Calif., a corporation of Delaware Application October 28, 1947, Serial No. 782,621

14 Claims. (Cl. 23—2)

This invention relates to the oxidation of sulfhydryl or hydrosulfide compounds, i. e. hydrogen sulfide ($H_2S$) and organic derivatives thereof in which one of the hydrogen atoms attached to the sulfur atom is replaced by an organic radical, to neutral sulfur substances, i. e. free sulfur and organic disulfides. More particularly, it deals with the catalytic oxidation of hydrogen sulfide and of mercaptans, including both aliphatic mercaptans and aromatic mercaptans (thiophenols) and derivatives thereof wherein certain organic oxidation catalysts are employed as catalysts for the oxidation.

The oxidation of hydrosulfides has particular application in the treatment of sour hydrocarbons (that is, liquid and gaseous hydrocarbons which contain sour, i. e. acidic, hydrosulfides, such as hydrogen sulfide, per se, and organic derivatives thereof such as mercaptans. Heretofore, it has been the practice to extract such hydrosulfides from sour hydrocarbons by means of an alkaline solution, then to oxidize or otherwise remove the extracted hydrosulfides from the alkaline extracting solution to regenerate it, and to recycle the thus regenerated alkaline solution for extracting a further quantity of hydrosulfides. Other fluids which are treated for the removal and/or recovery of hydrosulfides are, for example, water gas which may be formed from sulfur-containing coal, hydrogen as produced by various commercial methods (natural gas reacted with steam at a high temperature in the presence of a suitable catalyst), nitrogen as obtained from combustion gases, especially from the combustion of coal. In all such cases, it has been the practice first to remove the hydrosulfides by alkaline extraction. In many cases it is not desirable or convenient to effect the removal of the hydrosulfide by alkaline extraction, such as in those cases where there are present other substances which are soluble in alkaline solutions, the removal of which is not desired.

It is, therefore, a principal object of this invention to provide an improved process for the conversion of hydrosulfides to neutral sulfur substances by oxidation. A further object is to provide an improved process for the removal of hydrosulfides from fluid mixtures containing them. A still further object is to provide an improved process for the recovery of hydrosulfides from fluid mixtures containing them and to recover said hydrosulfides in the form of valuable conversion products thereof. Another object is to simply, economically and efficiently remove hydrosulfides from sour hydrocarbons containing them without the necessity of using an alkaline extracting solution therefor. A more specific object is to recover the hydrogen sulfide-sulfur content of waste gases, such as waste refinery gases, etc., as free sulfur by an improved method. Other objects will appear from a reading of the following description of the invention.

Now, in accordance with the present invention, it has been found that hydrosulfides are readily oxidized to neutral sulfur substances by oxidizing agents therefor in the presence of a neutral or acidic aqueous solution containing a relatively small proportion of a water soluble indigo compound, that is, an indigo compound containing an aromatic ring which is substituted with a polar water-solubilizing radical, such as a sodium indigo sulfonate. Also within the scope of the invention is the oxidation of hydrosulfides to neutral sulfur substances by the use of said indigo compounds themselves, in the oxidized form.

Generally described, the present invention provides an improved process for the conversion of hydrosulfides, such as hydrogen sulfide and organic hydrosulfides, including both simple hydrocarbon hydrosulfides (simple mercaptans) and derivatives thereof which may contain as substituents of the hydrocarbon radical various radicals which have higher oxidation potentials than disulfide and which are not adversely affected by and do not themselves adversely affect water soluble indigo compounds, i. e. do not adversely affect the oxidation-reduction equilibria thereof, by catalytic oxidation to neutral sulfur substances in the presence of indigo compounds. The process of the invention comprises treating a hydrosulfide-containing fluid, either gaseous or liquid, said hydrosulfide being characterized as described above, with an oxygen-containing oxidizing agent for the hydrosulfide, preferably with an agent containing free oxygen, in the presence of an aqueous neutral or acidic (i. e. pH not above 7 and preferably not above 6) solution containing dissolved, at least in part, an indigo compound, such as a water-soluble indigo sulfonate compound; in some applications the indigo in an oxidized form may serve as the oxidizing agent.

Hydrosulfides as utilized in the present invention may occur in natural and synthetic materials. Thus, petroleum or coal tar fluids, such as natural or coke oven gases, natural gasolines, gasolines, kerosene, etc., both straight run and cracked, usually contain hydrogen sulfide and/or mercaptans, i. e. the simple hydrocarbon hydrosulfides. Furthermore, these hydrosulfides and derivatives thereof may be obtained from other sources or prepared synthetically and may be oxidized in accordance with the present invention to produce desirable derivatives thereof.

Some illustrative organic hydrosulfides, other than simple aliphatic and aromatic mercaptans, which may be oxidized by the method of this invention include such hydrocarbon hydrosulfide derivatives as hydroxy derivatives (2-mercapto-ethanol, 2-mercapto-propanol, 3-mercapto-propane-1,2-diol, 2,3-dithiol-propanol-1, etc.), halogen derivatives, particularly the chloro-, bromo- and fluoro-derivatives (2-mercapto-1-chloroethane, 3-mercapto-1-bromopropane, etc.), amino derivatives (3-amino-propan-1-thiol, 2-amino-pentan-1-thiol, etc.), carboxyl derivatives (thioglycolic acid, alpha-mercapto-stearic acid, alpha-mercapto-butyric acid, etc.), amino-carboxy-derivatives (alpha-amino beta-thiol propionic acid, alpha-amino-beta-thiol butyric acid, etc.), as well as corresponding hydroxy-, amino-, halogeno-, carboxy-, amino-carboxy-, etc., derivatives of aromatic thiols or thiophenols.

The aqueous solution employed in carrying out the oxidation of the hydrosulfide may contain various salts, if desired, to enhance the solubility of the hydrosulfide and/or the rate of contacting the hydrosulfide with the oxidizing agent. A buffer salt such as $NaHCO_3$, $NaH_2PO_4$, etc. may be added to the solution to oppose the acidifying tendency of acid materials which may be introduced from the hydrocarbon mixture. Other salts such as acid reacting salts as represented by $NaHSO_4$, $Al_2(SO_4)_3$, $NH_4Cl$, etc. may be employed to produce an acidic solution. An organic acid or an inorganic acid, such as acetic, propionic, chloroacetic, dichloroacetic, etc., acids and hydrochloric, sulfuric, phosphoric, etc. acids may be added to the solution for the purpose of acidifying it if it is desired. In general, the solubility of the hydrosulfide, particularly of hydrocarbon hydrosulfides, is decreased with increase in the acidity of the solution, and for that reason it is preferable to utilize a solution with a pH not lower than 2 to 3, except in the case of more soluble organic hydrosulfides containing water-solubilizing substituent radicals. However, when the hydrosulfide is not appreciably soluble in the aqueous solution, vigorous agitation and/or the use of suitable emulsifying agents are beneficial to ensure a satisfactory rate of reaction. In such cases, also, elevated temperatures are found to be effective in increasing the rate of reaction.

Oxidizing agents suitable for converting hydrosulfides to neutral sulfur materials include peroxides, permanganates, manganese dioxide, hypochlorites, oxygen, air, and also indigo compounds in an oxidized form. Air blowing at temperatures between about 60° F. and 200° F., and preferably not above 150° F. has been found to be a satisfactory method for oxidizing hydrosulfides in the presence of water-soluble indigo compounds. The pressure is usually atmospheric, but higher or lower pressures may also be employed, if desired. Pressures higher than atmospheric are particularly advantageous when the hydrosulfide is only slightly soluble in the aqueous medium.

Neutral sulfur substances formed by oxidation include free sulfur (oxidized from hydrogen sulfide) and organic disulfides (oxidized from hydrocarbon hydrosulfides and their derivatives) forming solid or liquid phases which, in general, are insoluble in or immiscible with the aqueous solution. These solid and liquid phases are easily removed from the solution by decantation, centrifugation, settling or filtering. The rate of settling of the sulfur materials in aqueous solutions may be increased by dilution in many cases. Furthermore, in certain solutions (such as aqueous solutions containing solubilizing agents—solubilizers) having a high content of organic constituents, organic disulfides, and especially those organic disulfides which contain water-soluble polar substituent groups such as hydroxyl, amino, carboxyl, sulfonyl, etc., groups, may be fairly soluble and may have to be extracted with suitable solvents, such as hydrocarbon liquids, halogenated hydrocarbon liquids, and the like. It will be understood that the term "neutral sulfur" as used herein relative to organic disulfides refers to the sulfide-sulfur portion of the molecule and has no reference to other possible substituent groups in the molecule. Thus, the bis-dithiodiglycollic acid ($HOOC.CH_2S.SCH_2.COOH$) obtained by the oxidation of thioglycollic acid ($HSCH_2.COOH$) is a neutral sulfur substance, as the term is used herein, although it will be understood that the substance itself as a whole is acidic by virtue of the two acidic carboxyl groups present.

The particular oxidation catalysts of this invention are indigo compounds which may be represented by the class formulae:

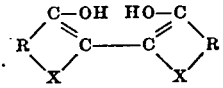

and

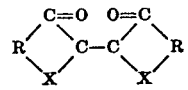

wherein R is an aromatic ring (which may be isocyclic or heterocyclic) such as benzene, naphthalene, pyridine, quinoline, etc., condensed with the heterocyclic rings shown and X is a radical or an atom such as O, S, Se, NH, SO, $SO_2$, $CH_2$, CH=CH, etc. The aromatic type ring is preferably substituted with a water-soluble polar radical, preferably an acid radical, which makes the compound at least partially soluble in aqueous solutions. Preferred radicals are carboxyl or sulfonic acid; others comprise hydroxy, amino, nitro radicals, etc. Additional radicals such as halogen, alkyl, etc., may be substituted on the aromatic ring, these substituents being particularly advantageous in those cases where the organic hydrosulfide possesses only a very low solubility in the aqueous solution.

Some suitable catalysts are mono and disulfonic acids of indigo or of leuco indigo; of indirubin, thio-indigo, 6,6'-dibromoindigo, 5,7,5'-tribromoindigo, 5,5',7,7'-tetrabromoindigo, pentabromoindigo, thioindigo scarlet R, ciba scarlet, thionaphthene-indolindigo, ciba violet B, ciba violet 3B, naphthalene-indolindigo, alizarin-indigo 3R, 4,4'-dimethyl-6,6'-dichlorothioindigo, oxindigo, selenindigo, and the reactions products of isatin-alpha-anilide or isatin chloride with thioindoxyl, phenols, naphthols, anthranols, etc.

Many indigo compounds have three oxidation stages: leuco indigo, indigo proper, and dehydroindigo. These can be converted into each other by oxidation and reduction respectively. This reactivity accounts for the effectiveness of these compounds as oxidation catalysts. Some indigo compounds, such as thioindigo, have only two stages, there being no dehydro-form. However, two stages are sufficient for catalytic activity.

The amount of catalyst employed may vary between about 0.001% and 5% by weight (and preferably between 0.01% and 3% by weight) of the solution to be oxidized containing the hydrosulfides or between about 0.05% and 25% by weight of the hydrosulfide. Within the above limits greater amounts of catalyst produce faster oxidation of the hydrosulfides for any given set of operating conditions. The catalysts of this invention are, in general, relatively resistant to oxidative deterioration under the conditions usually employed in the practice of the invention.

The catalytic oxidation of the hydrosulfide (hydrogen sulfide or organic hydrosulfide) may be effected by dissolving the hydrosulfide in a neutral or acidic aqueous solution and subsequently subjecting the solution containing the dissolved hydrosulfide to oxidation in the presence of a dissolved amount of an indigo compound. However, if desired, as will generally be the case when it is desired to recover the hydrogen sulfide-sulfur content of waste refinery gases, and the like, air (or other suitable oxygen-containing gas, including substantially pure oxygen) may be fed substantially simultaneously with the hydrogen sulfide-containing gas into a lower section of a contacting column or vessel wherein the two gases are contacted with each other and with a neutral or acidic aqueous solution containing dissolved a relatively small proportion of an indigo compound. The resulting free sulfur (or hydrocarbon disulfide in the case of the presence of mercaptans in the waste gas) may be allowed to separate from the aqueous phase in the column or vessel and withdrawn therefrom or the aqueous phase containing admixed therewith the free sulfur (or organic disulfide) preferably may be withdrawn from the contacting column, as in a counterflowing operation, and transferred to a suitable apparatus for effecting separation of the aqueous solution of the catalyst from the solid and/or liquid phases of sulfur and/or organic disulfides, the separated aqueous solution containing the catalyst, with or without added solubilizer, then being recycled to the contacting column for oxidation of a further portion of the hydrosulfides. In this case, it will be understood that the proportion of air (oxygen) utilized in the process will depend on various factors, such as whether complete recovery of the hydrosulfide is required, whether it is permissible that the hydrosulfide-stripped material contain free oxygen, the amount of oxygen which may be admixed with the hydrosulfide-containing mixture before reaching explosive limits, etc.

The invention will be more fully understood from a description of an embodiment thereof, which is made with reference to the accompanying drawing which is made a part of the specification and which is a diagrammatic sketch showing an application of the invention to the removal and recovery of hydrogen sulfide-sulfur, and also of volatile mercaptan-sulfur if such is present, from a waste refinery gas containing hydrogen sulfide and possibly also light mercaptans such as methyl and ethyl mercaptans.

Referring to Fig. I of the drawing, a waste refinery gas containing hydrogen sulfide, with or without mercaptan vapors, which refinery gas will be well known by those familiar with petroleum refining operations, similar gases insofar as the application of the present invention is concerned being obtained from certain natural gas wells as well as wet-condensate gas and oil-field operations, is delivered through a valved line 11 to a lower section of a contacting column 12 wherein the waste gas is countercurrently contacted with an aqueous solution of sodium indigo sulfonate which is introduced into the upper section of column 12 through a valved line 14, a stream of air being delivered through line 15 and/or 16 and 11 to the column 12 simultaneously with the waste gas and flowing concurrently with the waste gas in counterflow to the aqueous solution and the oxygen therein reacting with the hydrogen sulfide and mercaptans in the waste gas stream. Since it is generally desired to remove substantially all of the hydrosulfides from the waste gas stream so that its disposal will be simplified, the amount of air (oxygen) utilized is in at least slight excess of the theoretical requirement for complete oxidation of the hydrosulfides to the neutral sulfur substances. Also, as will be understood and as indicated in the drawing, portions of the oxygen may be admixed with the waste gas at different points inside the column. This, of course, makes it possible to maintain a low concentration of free oxygen at any one point in the zone of contacting. The treated gas is withdrawn through valved line 17, while any hydrocarbon disulfides which may be formed and which may separate out in the top section of column 12 are withdrawn through a valved line 19, valve 20 being controlled, if desired, by means of liquid level control means 21 which is adapted to be responsive to changes in an interface between the aqueous solution and the liquid disulfide phase in the zone designated by 22.

The aqueous solution of the indigo sulfonate, containing dispersed therein finely divided sulfur produced by the catalytic oxidation of the hydrogen sulfide, collects in the bottom zone of the contactor 12, as indicated by 24. Some of the sulfur may be allowed to settle out of the solution in zone 24 and then be withdrawn by means of a valved line 25. The solution containing the indigo sulfonate catalyst, and which may or may not contain a part or all of the sulfur in suspension therein, as well as hydrocarbon disulfides dissolved or dispersed therein, is withdrawn through a line 26. Various methods may be utilized for the recovery or regeneration of the aqueous sulfonate solution depending on the materials actually present and the most convenient or otherwise suitable combination of operations which will be effective in effecting the separation of sulfur and/or hydrocarbon disulfides from the aqueous indigo sulfonate solution.

In one method of effecting the desired separations, the mixture withdrawn from zone 24 through line 26 is delivered by line 27 to a settler and phase separator 29, wherein the sulfur is allowed to settle as a lower separated solid phase and the insoluble liquid disulfides, or that amount above saturation, are allowed to separate as a separate upper liquid phase. The settled sulfur is withdrawn through a line 30 while the disulfides are withdrawn from the upper section of the settler through a valved line 31. Suitable valve control means responsive to changes in interface level between the aqueous solution and the liquid disulfide phase may be provided for controlling the valve in line 31. The separated aqueous phase may be withdrawn through a valved line 32, valve 34 therein being controlled by a liquid-liquid interface level-responsive control means 35, and the aqueous phase of indigo sulfonate returned through line 36, heat exchanger 37 which may be utilized to heat or cool the solution as desired, and line 14 to the contacting column 12. The aqueous solution may be passed through a filter 33, or other suitable solid-liquid separating apparatus, if it is desired to remove the sulfur from the aqueous solution more completely than is effected in settler 29.

If the separation of disulfides from the aqueous solution is not as complete as desired in settler 29, the aqueous solution is withdrawn in whole or in part (a portion may still be returned by line 32 and/or filter 33 as described above) through valve controlled line 38 and delivered through line 39, or filter 40 and line 41 if desired, to an extractor 42. Also, the separation in settler 29 may be by-passed entirely or in part and the fluid stream in line 28 delivered directly to filter 40 and line 41, or to line 39, and thence to extractor 42. The aqueous solution delivered to extractor 42 is countercurrently contacted therein with a suitable water-immiscible liquid which is a solvent for the hydrocarbon disulfides and which is introduced into a lower zone 44 of the extractor by means of a line 45. In general, the solvent is selected so that its separation from the extracted disulfides may be effected by simple distillation or other suitable means. For light disulfides, such as dimethyl disulfide, it will generally be found that a liquid hydrocarbon having a higher boiling temperature that the disulfide will be satisfactory, whereas, in other applications of the invention where the disulfides have relatively higher boiling temperatures, it will be found to be more satisfactory to utilized solvents which have relatively lower boiling temperatures. In the embodiment of the invention presently described, the solvent is a light hydrocarbon mixture which has a boiling temperature sufficiently higher than that of the disulfides so that their separation by ordinary fractional distillation is readily accomplished. The solvent (hydrocarbon) extract of the disulfides is withdrawn from the top of the extractor (which may be of any of the conventional designs suitable for liquid-liquid contacting) by means of a valved line 46 while the aqueous solution of the indigo sulfonate is withdrawn through a line 47 and returned therethrough to line 36 and heat exchanger 37 and thence to the contacting column 12.

The solvent extract in line 46 is passed in out-of-contact heat exchange with hot liquid bottoms in heat exchanger 47 and thence into a fractional distilling column or fractionator 49 wherein it is separated by fractional distillation into an overhead distillate fraction containing the disulfides withdrawn through a line into a bottoms liquid fraction of the solvent (hydrocarbon mixture) which is withdrawn through a line 51. The fractionator is provided with suitable heating means 52 in the bottom thereof and with suitable cooling means 54 in the top thereof. The overhead distillate vapors may be cooled in a cooler or condenser 55 and collected in a vessel 56 from which they may be withdrawn through a line 57. The recovered solvent in line 51 is cooled, at least partially, by the incoming solvent extract in heat exchanger 47, and, if desired, is cooled further in a heat exchanger 59 and then returned to extractor 42. Any solvent which is lost either or both to the aqueous solution in extractor 42 and/or to the separated disulfides in fractionator 49, is made-up for by additional solvent which is introduced from a suitable source through line 45.

In those applications where it is more suitable to employ a solvent having a lower boiling temperature than the produced disulfides, the solvent is recovered as distillate from fractionator 49 and is returned to the extractor 42 by way of lines 50 and 60, heat exchanger 61, line 62, heat exchanger 59 and line 64. The higher boiling disulfides are withdrawn from the bottom of the fractionator through lines 51 and 65.

In order to simplify the description of application of the invention many of the required valves, pumps, flow measuring and control devices, etc., have been omitted. The proper placement of such means and devices will be understood by one skilled in the art in view of the foregoing description.

In some applications of the invention for the removal of, say, hydrogen sulfide from a fluid containing it, it is more satisfactory first to contact the fluid with an aqueous solution to extract the hydrogen sulfide and then to contact the aqueous extract, after adjusting the pH thereof to a value not greater than 7, with air or any other suitable oxidizing agent in the presence of the indigo compound catalyst. The catalyst may advantageously be dissolved in the extracting aqueous solution and recycled with it in the sequence of steps in a cyclic system of operations. The free sulfur which results from the oxidation of the hydrogen sulfide is separated from the aqueous solution by any suitable means and the resulting regenerated solution is then used again for extracting a further portion of hydrogen sulfide.

Another embodiment of the invention is represented diagrammatically by Fig. II. An application of the invention was carried out by the process shown in Fig. II and is described here as illustrative thereof. Referring to Fig. II, a gas stream containing 5–25% H₂S admixed with water-insoluble gaseous components such as low molecular weight hydrocarbons and/or nitrogen and/or hydrogen, and the like, was countercurrently contacted in a contacting column 71, with an aqueous solution containing oxidized sodium indigo disulfonate. The column 71 may be of any suitable design such as a cylindrical column substantially filled with Raschig rings or the like and provided with suitable end-separating sections and feed and withdrawal means. The temperature of the contacting fluids was about 75° F. and the concentration of the indigo compound in the aqueous solution thereof was between about 0.01% and 0.1% by weight. The relative rates of flow of the contacting fluids were adjusted so as to give a treated fluid stream which was free of hydrogen sulfide (substantially 100% removal of $H_2S$ was effected). In fact, since the indigo compound in an oxidized form appeared to be more stable against deterioration in the presence of hydrogen sulfide in a substantially neutral or slightly acidic solution than the reduced form, the contacting was carried out under conditions to maintain at least an excess of the indigo sulfonate in the oxidized form.

The aqueous solution of indigo sulfonate, largely in the reduced state, containing the free sulfur suspended therein and any dissolved $H_2S$ was transferred through a line 72 to a regenerating column 74 wherein it was countercurrently contacted with a stream of air for the purpose of converting the indigo sulfonate back to an oxidized state and insuring the oxidation of any hydrogen sulfide dissolved in the solution. Any other suitable oxidizing agent which would oxidize the indigo compound only to a reversibly reducible form would be satisfactory for the regeneration. This regeneration was also effected at about 75° F. and under atmospheric pressure. The regenerated indigo sulfonate solution was withdrawn through a line 75 and transferred to a surge and settling tank 76. The sulfur settled out in tank 76 under the influence of gravity and was withdrawn through a suitable line 77. The thus clarified aqueous solution of the oxidized indigo sulfonate was withdrawn from settler 76 and returned through a line 79 to the contactor 71. In this application of the invention, it will be understood that the quantity of sulfur produced will be proportional to the catalyst recycled. In some tests it has been determined that the indigo sulfonate was used in as many as 400 cycles.

Although the invention finds its most useful application in the treatment of gases containing hydrogen sulfide, it is equally applicable to the removal of mercaptans from gaseous mixtures and also of hydrogen sulfide and of mercaptans from liquid mixtures, particularly liquid streams of hydrocarbons.

The following examples of applications of the invention, which are given for the purpose of illustration only and are not to be construed as in any way limiting the invention, will aid in a still further understanding of the practice and utility thereof.

Example I.—A refinery waste gas (ethane vent gas) containing about 15% by volume of hydrogen sulfide was countercurrently contacted, in an extractor column provided with Raschig rings, with a substantially neutral aqueous solution containing 0.01% by weight of sodium indigo disulfonate (based on the aqueous solution) in proportions and at rates adjusted to result in substantially complete extraction of the hydrogen sulfide. (If it is desired, a major proportion only of the hydrogen sulfide may be extracted in the substantially neutral or slightly acidic solution in accordance with the invention and the remaining amount of hydrogen sulfide which is more difficult to extract may be finally removed by extraction or scrubbing of the partially stripped gas stream with an aqueous alkaline solution, such as one of sodium hydroxide, sodium carbonate, sodium phosphate, and the like. In that case, of course, the amount of alkali required is advantageously reduced from the amount which would be required for extraction of all of the hydrogen sulfide in the original waste gas.) The aqueous extract was then air blown in a second countercurrent contactor, at a temperature of about 110° F., with a resulting oxidation of better than 99% of the hydrogen sulfide in the solution and the production of about 15 to 20 parts by weight of free sulfur for each part by weight of catalyst present in the solution.

An advantage of this method of application of the invention over the application represented by Fig. I of the drawing is that the other components of the hydrogen sulfide-containing gas are not contacted or admixed with the oxidizing agent.

Example II.—When ten parts by weight of thioglycolic acid is dissolved in water containing 0.5 parts by weight of sodium indigo disulfonate and air is passed into the solution until, by test, the solution is substantially free from the hydrosulfide radical, and a small amount of a mineral acid such as sulfuric acid is added to the resulting solution to ensure the existence of the oxidized disulfide product in the unionized form, approximately quantitative recovery of the bisdithiodiglycolic acid is obtained by extraction of the aqueous solution with a suitable water-immiscible solvent for the acid, such as methyl isobutyl ketone, followed by separation of the solvent from the thus extracted acid by distillation.

Applicant's copending application Serial No. 542,257, filed June 26, 1944, now U. S. Patent No. 2,432,301, issued December 9, 1947, is directed to the regeneration of spent aqueous alkaline solutions containing hydrosulfides extracted from sour hydrocarbons by contacting such spent aqueous alkaline solutions with an oxygen-containing oxidizing agent in the presence of a small amount of a water-soluble indigo compound, such as sodium indigo disulfonate, as oxidation catalyst.

I claim as my invention:

1. A process for oxidizing the sulfide-sulfur-content of a hydrogen sulfide-containing gas to free sulfur, comprising contacting said gas with an aqueous solution having a pH not greater than 7 and containing as substantially the only oxidizing agent for said hydrogen sulfide an indigo compound having an aromatic ring which is substituted with a polar water-solubilizing radical and which is in an oxidized state and in such proportion and in an amount sufficient to oxidize substantially all of the sulfide-sulfur-content, separating the thus treated gas from the resulting aqueous solution and free sulfur, regenerating the separated aqueous solution by treating with an oxidizing agent to convert the indigo compound to the original oxidized state, separating the aqueous solution from the free sulfur, and utilizing the regenerated aqueous solution to contact a further portion of a hydrogen-sulfide containing gas.

2. A process for the removal of hydrogen sulfide from a hydrogen sulfide-containing gaseous mixture, comprising extracting a substantial proportion of said hydrogen sulfide from said mixture with an aqueous solution having a pH not greater than 7, subsequently contacting the resulting extract solution with an oxygen-containing gas in the presence of a small amount of an indigo compound having an aromatic ring which is substituted with a polar water-solubilizing radical thereby converting the hydrogen sulfide-sulfur to free sulfur, separating the free sulfur from the resulting aqueous solution and utilizing the aqueous solution for extracting a further quantity of hydrogen sulfide.

3. A process for oxidizing the sulfide-sulfur-content of a hydrogen sulfide-containing gas to free sulfur, comprising contacting said gas with an aqueous solution having a pH not greater than 7 and containing as substantially the only oxidizing agent for said hydrogen sulfide an indigo compound having an aromatic ring which is substituted with a polar water-solubilizing radical and which is in an oxidized state and in such proportion and in an amount sufficient to oxidize substantially all of the sulfide-sulfur-content.

4. A process for oxidizing the sulfide-sulfur-content of a hydrogen sulfide-containing gas to free sulfur, comprising contacting said gas with an aqueous solution having a pH not greater than 7 and containing as an oxidizing agent for hydrogen sulfide an indigo compound having an aromatic ring which is substituted with a polar water-solubilizing radical and which is in an oxidized state and in such proportion and in an amount sufficient to oxidize substantially all of the sulfide-sulfur-content.

5. A process for converting hydrosulfides to neutral sulfur substances, comprising contacting a non-alkaline aqueous solution containing said hydrosulfides and an indigo compound having an aromatic ring which is substituted with a polar water-solubilizing radical, said aqueous solution having a pH not greater than 6, with an oxygen-containing gas.

6. A process for oxidizing the sulfide-sulfur-content of a hydrogen sulfide-containing gas to free sulfur, comprising contacting said gas with an oxygen-containing gas in the presence of a non-alkaline aqueous solution having a pH not greater than 6 and containing an indigo compound having an aromatic ring which is substituted with a polar water-solubilizing radical.

7. A process for oxidizing the sulfide-sulfur-content of a hydrogen sulfide-containing fluid to free sulfur, comprising contacting said fluid with an oxygen-containing oxidizing agent for hydrogen sulfide in the presence of a non-alkaline aqueous solution having a pH not greater than 6 and containing an indigo compound having an aromatic ring which is substituted with a polar water-solubilizing radical.

8. A process for converting hydrosulfides to neutral sulfur substances, comprising contacting a non-alkaline aqueous solution containing said hydrosulfides and an indigo compound having an aromatic ring which is substituted with a polar water-solubilizing radical, said aqueous solution having a pH not greater than 6, with an oxygen-containing oxidizing agent for said hydrosulfides.

9. A process for converting hydrocarbon hydrosulfides to hydrocarbon disulfides comprising contacting said hydrosulfides with an oxygen-containing oxidizing agent for said hydrosulfides in the presence of a non-alkaline aqueous solution containing an indigo compound having an aromatic ring which is substituted with a polar water-solubilizing radical, said solution having a pH not greater than 6.

10. A process for converting hydrocarbon hydrosulfides to hydrocarbon disulfides comprising contacting said hydrosulfides with an oxygen-containing oxidizing agent for said hydrosulfides in the presence simultaneously of a non-alkaline aqueous solution having a pH not greater than 6 and of an indigo compound having a aromatic ring which is substituted with a polar water-solubilizing radical.

11. A process for converting organic hydrosulfides which may contain only substituent radicals which have higher oxidation potentials than a disulfide radical and which substituent radicals are without adverse effect on the oxidation-reduction equilibria of indigo compounds, to neutral sulfur substances, comprising contacting said organic hydrosulfides with an oxygen-containing oxidizing agent for said hydrosulfides in the presence simultaneously of a non-alkaline aqueous solution having a pH not greater than 6 and of an indigo compound having an aromatic ring which is substituted with a polar water-solubilizing radical.

12. A process for converting hydrosulfides to neutral sulfur substances, comprising contacting said hydrosulfides with an oxygen-containing oxidizing agent for said hydrosulfides in the presence of a non-alkaline aqueous solution having a pH not greater than 6 and containing dissolved a small amount of an indigo compound having an aromatic ring which is substituted with a polar water-solubilizing radical.

13. A process for converting hydrosulfides to neutral sulfur substances, comprising contacting said hydrosulfides with an oxygen-containing oxidizing agent for said hydrosulfides in the presence of a non-alkaline aqueous solution having a pH not greater than 6 and containing a small amount of a water-soluble indigo compound.

14. A process for the removal of hydrogen sulfide from a hydrogen-sulfide-containing gas and the recovery of the hydrogen sulfide-sulfur as free sulfur, which process comprises countercurrently contacting a non-alkaline aqueous solution having a pH not greater than 6 and containing sodium indigo disulfonate simultaneously with a stream of said hydrogen sulfide-containing gas and a stream of air flowing concurrently therewith, the amount of air being substantially the theoretical requirement for complete oxidation of the hydrogen sulfide to free sulfur, separating the resulting aqueous solution containing free sulfur admixed therewith from the treated gas, separating the free sulfur from the aqueous solution, and recycling the separated aqueous solution containing dissolved sodium indigo disulfonate for similarly treating a further portion of the hydrogen sulfide-containing gas.

LLOYD C. FETTERLY.

REFERENCES CITED

The following references are of record in the file of this patent:

UNITED STATES PATENTS

| Number | Name | Date |
|---|---|---|
| 2,432,301 | Fetterly | Dec. 9, 1947 |